UNITED STATES PATENT OFFICE.

GEORG KALISCHER, OF FRANKFORT-ON-THE-MAIN, GERMANY, ASSIGNOR TO CASSELLA COLOR COMPANY, OF NEW YORK, N. Y.

SULFO-ACID AND PROCESS OF MAKING SAME.

No. 807,117.     Specification of Letters Patent.     Patented Dec. 12, 1905.

Application filed August 21, 1905. Serial No. 275,171.

*To all whom it may concern:*

Be it known that I, GEORG KALISCHER, doctor of philosophy, a citizen of Prussia, and a resident of Frankfort-on-the-Main, in the Province of Hesse-Nassau and Kingdom of Prussia, Germany, have invented certain new and useful Manufacture of New Sulfo-Acids, of which the following is a specification.

It is known (*Berichte der Deutschen Chem. Gesellschaft*, XXIX, page 1502) that the 1.2-naphthalenediamin combines, under suitable conditions, with two molecules of benzaldehyde, forming the naphthobenzaldehydin of the following constitution:

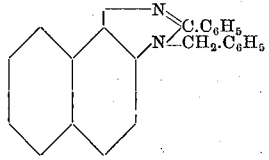

Now the formation of this body is rather difficult, and the reaction yields, in the first place, the monobenzylidin compound. I have, however, discovered that with the oxysulfo derivative of the 1.2-naphthalenediamin—*i. e.*, the diamidonaphtholsulfo-acid (which may be obtained by the reduction of suitably-constituted azo derivatives of the 2.amido.5.naphthol.7.sulfo-acid)—the condensation with aldehydes in the manner above described takes place without any difficulty in an aqueous solution. Valuable products of substitution are obtained if in place of benzaldehyde derivatives of the same, especially amido or nitro benzaldehyde, are employed, because in this way primary amido groups may be introduced into the lateral benzene nuclei. The thus-obtained acids possess the following formula:

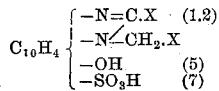

(X representing an aromatic radical such as C₆H₅ or a product of substitution such as C₆H₄.NO₂, C₆H₄.NH₂). All the acids obtained in this manner possess the property of combining with diazo bodies in an alkaline solution and of forming azo derivatives, dyeing cotton direct from alkaline baths orange-red to bluish-red shades.

The method of production is illustrated by the following example: 25.4 kilos 1.2.diamido.5.naphthol.7.sulfo-acid are suspended in water. 21.2 kilos benzaldehyde are then added and the whole boiled while stirring well until the diamido acid has disappeared. The 5.oxynaphthobenzaldehydin.7.sulfo-acid separates completely. It is filtered off, washed out, and dried. The pure acid is thus obtained in the form of a yellowish powder, which dissolves easily in alkalies. The sodium salt is obtained in colorless crystals. If the benzaldehyde is replaced by 24.2 kilos m-amidobenzaldehyde, the 5.oxynaphthodiamidobenzaldehydin.7. sulfo-acid is obtained in a like manner. The same acid results if the condensation is carried out with meta-nitrobenzaldehyde, and the product of reaction is reduced. It is difficultly soluble in water. Its sodium salt dissolves in water rather easily. It is transformed by nitrous acid into a tetrazo compound, which is of a yellow color and which in a soda solution dyes a red shade.

Having now described my invention and the manner in which it may be carried out, what I claim is—

1. The process of producing new sulfo-acids of the general formula

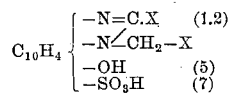

(in which X represents an aromatic radical) by condensing in aqueous solution one molecule of 1.2.diamidonaphthalene.5.oxy.7.sulfo-acid with two molecules of an aromatic aldehyde substantially as described.

2. The new sulfo-acids obtained by condensing in aqueous solution one molecule of 1.2.diamidonaphthalene.5.oxy.7.sulfo-acid with two molecules of an aromatic aldehyde, the said substances being powders of a slightly-yellowish tinge insoluble in water, alcohol and ether, soluble in alkalies and being precipitated from these solutions by means of acids substantially as described.

Signed at Frankfort-on-the-Main, in the Province of Hesse-Nassau and Kingdom of Prussia, this 31st day of July, A. D. 1905.

GEORG KALISCHER.

Witnesses:
   JEAN GRUND,
   CARL GRUND.